United States Patent
Zaacks

(10) Patent No.: US 8,412,039 B2
(45) Date of Patent: Apr. 2, 2013

(54) METHOD FOR ESTIMATING BANDWIDTH LIMITING EFFECTS IN HIGH FREQUENCY TRANSMISSION COMMUNICATION SYSTEMS

(75) Inventor: Mark Raymond Zaacks, Petach Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 655 days.

(21) Appl. No.: 12/446,050

(22) PCT Filed: Oct. 15, 2007

(86) PCT No.: PCT/IL2007/001230
§ 371 (c)(1),
(2), (4) Date: Apr. 17, 2010

(87) PCT Pub. No.: WO2008/047348
PCT Pub. Date: Apr. 24, 2008

(65) Prior Publication Data
US 2010/0290779 A1    Nov. 18, 2010

(30) Foreign Application Priority Data
Oct. 19, 2006 (IL) .......................... 178744

(51) Int. Cl.
*H04B 10/00* (2006.01)
(52) U.S. Cl. .................................. 398/25
(58) Field of Classification Search ............ 398/25
See application file for complete search history.

(56) References Cited

U.S. PATENT DOCUMENTS

| | | | | |
|---|---|---|---|---|
| 5,109,417 A | * | 4/1992 | Fielder et al. | 704/205 |
| 5,142,656 A | * | 8/1992 | Fielder et al. | 704/229 |
| 5,222,189 A | * | 6/1993 | Fielder | 704/229 |
| 5,230,038 A | * | 7/1993 | Fielder et al. | 704/229 |
| 5,357,594 A | * | 10/1994 | Fielder et al. | 704/200.1 |
| 5,479,562 A | * | 12/1995 | Fielder et al. | 704/229 |
| 5,521,733 A | * | 5/1996 | Akiyama et al. | 398/48 |
| 6,052,393 A | * | 4/2000 | Islam | 372/6 |
| 2002/0191240 A1 | * | 12/2002 | Myers et al. | 359/109 |
| 2004/0095210 A1 | * | 5/2004 | Nguyen | 333/187 |
| 2004/0172434 A1 | * | 9/2004 | Koyanagi | 708/301 |
| 2005/0012978 A1 | * | 1/2005 | Ibe et al. | 359/279 |
| 2006/0126702 A1 | * | 6/2006 | Burdett | 375/136 |
| 2006/0140632 A1 | * | 6/2006 | Mohs et al. | 398/85 |
| 2006/0255886 A1 | * | 11/2006 | Ninomiya et al. | 333/204 |
| 2007/0053420 A1 | * | 3/2007 | Koyanagi | 375/232 |
| 2008/0212980 A1 | * | 9/2008 | Weiner | 398/184 |
| 2010/0290779 A1 | * | 11/2010 | Zaacks | 398/25 |
| 2011/0053622 A1 | * | 3/2011 | Maruo et al. | 455/501 |
| 2011/0206204 A1 | * | 8/2011 | Sychev | 380/256 |

OTHER PUBLICATIONS

G. Dhosi, et al., Filter Concatenation Effects in Otical Networks, 2003 p. 4pp, p. 1, col. 1, p. 1, col. 2.
K. Sun., et al., Optimal Worst Case Filter Design Via Convex Optimization, Dec. 9, 2003, p. 1380-1385, vol. 1of 6, IEEE.

* cited by examiner

*Primary Examiner* — Agustin Bello
(74) *Attorney, Agent, or Firm* — Browdy and Neimark, PLLC

(57) ABSTRACT

A method for estimating a bandwidth limiting penalty of a chain of bandpass optical filters in an optical telecommunication system. The method is advantageous for systems carrying an optical signal at a bit rate of about 10 Gb/s, wherein average bandwidth of the filters in the chain is of the same order of magnitude as bandwidth of the optical signal. The method comprises selecting a worst case filter, checking the system by testing and/or simulating it as being provided with the selected worst case filter instead of the chain of filters, and then judging about the bandwidth limiting penalty of the chain of filters based on results of the checking.

20 Claims, 3 Drawing Sheets

| Link Testing | NRZ | RZ | Doubinary | DPSK | QPSK |
|---|---|---|---|---|---|
| o o o | | | | | |
| Bandwidth limiting penalty (dB) | 3.0 | 2.5 | 0 | 1 | 2.5 |
| Dispersion penalty (ps/mn) | 50 | 25 | 150 | 25 | |
| o o o | | | | | |

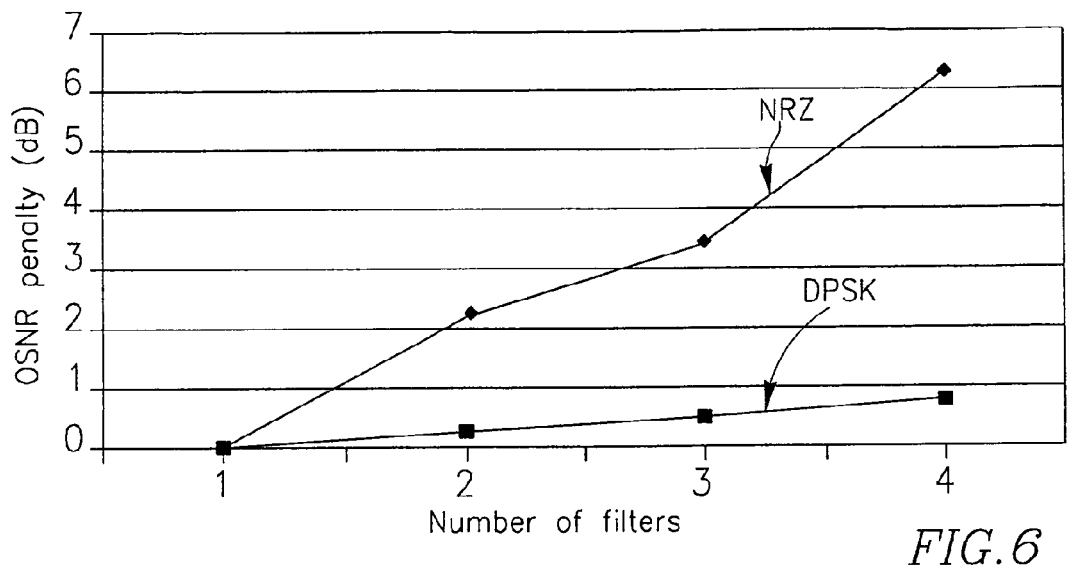
FIG. 6
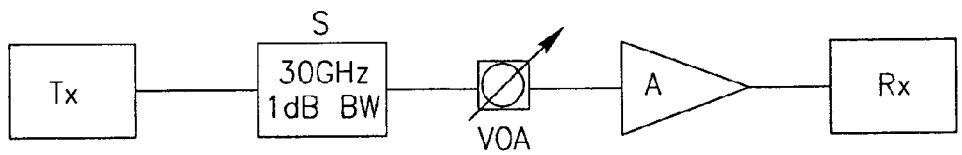
FIG. 7
| Link Testing | NRZ | RZ | Doubinary | DPSK | QPSK |
|---|---|---|---|---|---|
| ... | | | | | |
| Bandwidth limiting penalty (dB) | 3.0 | 2.5 | 0 | 1 | 2.5 |
| Dispersion penalty (ps/mn) | 50 | 25 | 150 | 25 | |
| ... | | | | | |
FIG. 8

METHOD FOR ESTIMATING BANDWIDTH LIMITING EFFECTS IN HIGH FREQUENCY TRANSMISSION COMMUNICATION SYSTEMS

FIELD OF THE INVENTION

The present invention relates to a technique for estimating workability of telecommunication systems, which are expected to comprise a number of band pass filters and operate at high frequency bit rates.

BACKGROUND OF THE INVENTION

Filter narrowing effects were rarely considered as a design issue in optical transmission systems such as WDM systems, since the usual filter bandwidth was always much larger than the bandwidth of a signal bit rate.

A new problem discussed in the present application has occurred, for example, in modern optical systems. Deployment of 40 Gb/s systems is constrained by multiple physical effects and design considerations. The system reach can be improved using advanced modulation formats to increase the tolerance to noise and non-linear effects, but at the same time, the bandwidth requirements of these modulation formats may increase. As bandwidth requirements increase, the system design considerations may limit the use of denser channel spacing and of filter cascades. Furthermore, it is highly desired, especially in 40 Gb/s systems, to use filter-based dispersion compensation modules DCMs (Bragg gratings, etalon, virtual imaged phase-arrays, etc.) rather than dispersion compensation fibers (DCFs) since the DCMs exhibit lower insertion loss and reduce non-linear effects. For flexibility of the network, it is also desired to use reconfigurable-add/drop modules (ROADMs), which also limit the system bandwidth. Multiple cascades of DCMs and ROADMs along with the desired move from 100 GHz to 50 GHz channel spacing create a considerable design constraint on high bandwidth transmission systems.

In view of the above, the combination of the higher bandwidth transmission, especially at or beyond 40 Gb/s, and the increasing use of filtering chains in the optical transmission systems leads to a new problem in designing of optical systems, not yet considered in the prior art.

A usual accepted way for estimating workability of communication systems is testing at least portions of the systems in a laboratory and based on that, making some design solutions. Another widely known approach is performing a mathematical simulation of the communication system, by creating a mathematical model of the system and further is simulating operation of the system by changing parameters of the mathematical model.

The first approach suffers, from practical reasons, by the fact that real communication systems may comprise a large number of elements (for example, filters, amplifiers, Dispersion Compensating Modules DCMs and fibers). Therefore, chaining such elements in a laboratory is impractical due to the high cost of the optical components and the increased time-to-deployment. The second approach requires a complex work of creating and checking the mathematical model. Nevertheless, in many cases the simulation does not give sufficiently precise results.

OBJECT AND SUMMARY OF THE INVENTION

There is a strong need in the field of communication, and in particular in the field of optical communication, for an effective method of testing high frequency communication systems before installation and/or a practical method of predicting or estimating workability of such systems.

In particular, there is a need of developing real, simple and duly confirmed (possibly-standardized) methods for testing the widely used communication systems utilizing modern advanced 40 Gb/s transmitters or other wide-band transmission systems (for example, RZ (return to zero pulse) 10 Gb/s systems) to determine their bandwidth limitation constraints.

The Inventor has found that workability of an optical telecommunication system, (for example, a WDM optical system) adapted to carry signals having high bit rate typically not less than 10 Gb/s (and preferably equal or more than 40 Gb/s) and expected to comprise a chain of bandpass optical filters, can be determined by estimating bandwidth narrowing effects, namely by selecting a so-called worst case filter and performing checking, by testing and/or simulating the mentioned system being provided with the selected worst case filter instead of the chain of said bandpass filters, and judging about the bandwidth narrowing effect of the system with the chain of said bandpass filters based on results of the checking and a predetermined maximal value of bandwidth limiting penalty.

A typical and measurable bandwidth narrowing/limiting effect is bandwidth limiting penalty.

Bandwidth limiting penalty in optical systems is understood as an extra value of OSNR (optical signal-to-noise ratio) required to reach, under a new condition, the same Bit Error Rate (BER) as in the system with no bandwidth limiting elements. A preliminarily agreed bandwidth limiting penalty means that the system with a bandwidth limiting filter still allows reaching the required BER by some reasonable increase of power/OSNR of the optical signal. Figure of merit can be any relative value to describe performance of the system. For example, a figure of merit could be selected to equal the limiting bandwidth (in GHz) which degrades the signal parameter by a certain predetermined system penalty.

The inventive idea can also be formulated as a method of modeling a chain of band pass filters in the above-described high speed transmission system, by selecting a worst case filter and checking the system by testing and/or simulating thereof, using the worst case filter. Preferably, the step of real testing in the laboratory should be performed for checking the system. In the simplest case, the system being checked may comprise the worst case filter connected by optical fiber spans between a high bit rate transmitter and a suitable receiver, and preferably a means of regulating power, signal to noise ratio (OSNR) or sensitivity, these means are required for measuring the penalty.

The worst case filter should be selected so that the bandwidth limiting penalty (OSNR penalty or power penalty) remains not greater than a preliminarily agreed maximal value for the system, which is typically equal to 2 dB (preferably 1 dB). This will guarantee that the working regime will not be sensitive to small changes in the system bandwidth.

The worst case filter can be selected based on the following conditions and rules that have been found empirically and then confirmed by both mathematical simulations, and laboratory tests.

I. The method is specifically intended for systems in which the bandwidth (BW) of the optical filtering is similar—i.e., have the same order of magnitude—to the bandwidth of an optical signal transmitted in the system. For example, a WDM transmission system will typically have a system bandwidth of less than 60% of its channel spacing, therefore, a 100 GHz channel spaced system will have a bandwidth of less than 60 GHz. This bandwidth is similar to the optical. bandwidth of a 40 Gb/s NRZ (non-return to zero) signaling format (which has a bandwidth of about 60 GHz). Therefore, the general condition for the filter narrowing design rule is:

$$BW_{filter} \leq BW_{signal} \quad (1)$$

For signaling schemes such as NRZ (non-return to zero), DPSK (differential phase-shift keying) and PSBT (phase-shaped binary transmission) the condition (1) can be also estimated as $$BW_{filter} < 2*BR, \text{ where BR—bit rate} \quad (2)$$

II. For selecting the worst case filter bandwidth, the following rule has been proposed by the Inventor: The worst case filter, in most practical cases, is a filter having the filtering bandwidth "$BW_{WCase filter}$" in the order of 30%-80% of the signal bandwidth:

$$0.30*BW_{signal} \leq BW_{WCase filter} \leq 0.8*BW_{signal} \quad (3)$$

When the bandwidth of the worst case filter is selected, the method further comprises selecting a real, so-called standard filter (labeled "S" in further drawings and calculations), which satisfies the expression (3) so that its bandwidth is maximally close to the lower border of the exression, while still allowing passage of the high-speed signal there-through with a bandwidth limiting penalty not exceeding the predetermined maximally agreed bandwidth limiting penalty (for example 2 dB), and thus can be considered the real worst-case filter.

The standard filter should be understood as a real filter having predetermined parameters of bandwidth and shape. For example, a standard filter can be an industrially available filter with guaranteed values of the bandwidth and shape. Another (but not the last) example of a standard filter can be a filter being available in a laboratory and having values of the mentioned parameters, known in advance. Preferably, such a laboratory filter may have bandwidth adjustable between a number of predetermined guaranteed bandwidth values (actually, between a number of predetermined shapes).

In the step of selecting the standard filter,—to ensure that it is really the worst case one,—the method may comprise an iterative process of selecting a standard filter, including selecting a candidate of the standard filter, testing the system with the candidate of the standard filter, obtaining the bandwidth limiting penalty exceeding the predetermined value, selecting a filter with the bandwidth broader than that of said candidate and testing the system again until the filter still ensures the system operation while does not exceed the predetermined maximal value of the bandwidth limiting penalty.

Further preferably, the standard filter is a flat top filter. It should be noted that the chain of filters in this case is preferably supposed to mainly comprise flat top filters. In other words, for checking the chain of filters mainly comprising flat top filters, the worst case filter (and the standard filter) should preferably be selected among flat top filters.

Similarly, for checking the chain of filters mainly comprising Gaussian filters, the worst case filter (and the standard filter) should preferably be a Gaussian filter.

Testing the selected standard filter with the high-speed transmission system should provide a worst case bandwidth limiting penalty, or figure of merit which should be used to estimate the worst case bandwidth limiting penalty of the filter chain.

In the above-mentioned example of a 100 GHz spaced WDM system, a standard filter "S" can be a flat-top shaped 30 GHz bandwidth filter. It should be noted that using such a narrow-band filter for testing high bit rate (more than 10 Gb/s) communication systems is non-obvious, since by now it has been assumed in the prior art that narrow band pass filters (i.e., filters having the filtering bandwidth being 60% or less of the signal bandwidth) are impractical; they were considered as strongly degrading the high bit-rate signal in such telecommunication systems. Though recent developments in signal modulation formats such as PSBT, DPSK and DQPSK, and advanced forward error correction (FEC) techniques improve the bandwidth limiting tolerance, still the general problem is not resolved.

It has been found by the Inventor, that in case the testing of the system with the standard filter is successful, the real chain of filters (up to 20 flat-top filters) in the real system may be allowed.

For example, in a practical case, if one uses a standard filter "S" of flat-top characteristics with 50% of the bandwidth characteristics of the typical system filter (i.e., the bandwidth of "S" is 50% of the average BW of a filter used in the system) then the number of filters that can be chained may be increased to 20 within the predetermined penalty.

In other words, the method allows for estimating the bandwidth limiting effect of the chain comprising up to 20 flat top filters, by using the standard flat top filter having bandwidth of about 50% the average or typical BW of a filter in the chain. However, this will depend heavily on the type of chained filters.

If, according to the system design, the chain of filters must comprise one or more Gaussian shaped (Gaussian) filters, the number of allowed filters in the chain should be reduced.

For example, if ideal Gaussian shaped filters are used for both "S" and the system, and the bandwidth of "S" is half the bandwidth of the average system filter, then only up to 4 Gaussian filters may be chained in order to obtain the same performance. This means, that chains of Gaussian shaped filters up to 4 can be estimated by using one standard Gaussian shaped filter having half bandwidth of a filter in the chain.

Estimations for mixed filter chains comprising both flat top and Gaussian filters depend on many factors including a) proportion between quantities of different filters in the chain, b) their real shape and c) modulation format of the signal.

In addition to the described checking step, the method may comprise further steps, such as:
modeling (calculating) the system comprising the real chain of filters to obtain the filters chain bandwidth, and
comparing the obtained bandwidth with the bandwidth of the worst case filter. If the bandwidth of the chain is greater than the bandwidth of the worst case (standard) filter, for most modulation formats (other than PSBT) one may conclude that the system will operate under the predetermined value of the bandwidth limiting penalty.

Filters of a real filter chain in an optical communication line may be presented as OADMs, ROADMs, DCMs, DWDM multiplexers and demultiplexers. These filters may be of many different types and shapes, so in order to estimate the overall chained filter shape, the following steps can be included.

A chain of filters can be modeled by first obtaining attenuation characteristics as a function of wavelength for each filter in the system, and then using any calculation method to estimate the resulting filter shape—i.e. the resulting bandwidth—of the desired filter chain. The modeling may include statistical distributions around the given/measured bandwidth values of each filter to estimate the absolute or real "worst case" resulting bandwidth and shape of the chain. This filter chain is labeled "Z". If the bandwidth of "Z" is greater than the bandwidth of the standard filter labeled "S" (which is known in advance), the worst-case system penalty will usually be lower than the penalty determined for "S". (Exceptions exist for certain modulation formats—for example, for PSBT). In other words, the modeling of a chain of filters, combined with the described selection of the worst case filter, can give a true estimation of the worst case penalty of the system.

One specific example of performing the calculation is presented below.

Suppose that the signaling scheme (i.e., the communication system) is measured for its penalty or figure of merit (i.e., tested with the worst case filter), so the calculation can be carried out on a specific link based on a required number of chained known filters, ROADMs, OADMs etc. Since the typical filter shape is known for each element, the overall filter shape can be determined. For example, if element 1 has filter shape with attenuation profile as a function of wavelength determined by points in a vector "A", element 2 has filter shape determined by points in a vector "B", etc., then the overall filter shape can be calculated by multiplying each element in the vectors to obtain the overall filter vector, Z such that $$Z_i = A_i * B_i * C_i * D_i \text{ etc. (Where "i" is a point in the vector)} \quad (4)$$

The bandwidth or shape of filter vector Z must be compared to the bandwidth or shape of filter vector S used to model the worst-case performance of the communication system. If the bandwidth of Z is greater than that of S (which is considered the worst case filter), then the overall bandwidth limiting effect of the system is less than the penalty specified by the S filter.

In general, and using the results of (4), it is recommended to compare the 1 dB bandwidth of the chained filter characteristics of simulated filters to the 1 dB bandwidth of the standard filter S, so that $$BW_{1dB}(\text{Standard}) < BW_{1dB}(\text{chained}) \quad (5)$$

(The "1 dB bandwidth" means the bandwidth of a filter measured at the level of OSNR being 1 dB lower that that at the peak of a curve illustrating the filter's spectrum).

As long as relationship (5) is true, then one can guarantee the system penalty determined by the standard filter. If this relationship is not realized, then one cannot guarantee the system performance under all the required conditions.

Therefore, the invention proposes a specific version of the method of estimating workability of a high bit rate communication system with a chain of filters by determining a worst case filter, then using it as a standard filter, determining bandwidth of the standard filter in the system, calculating the bandwidth of the chained filters (before or after using the standard filter to test the system), and comparing the calculated chained filters bandwidth with the standard filter bandwidth. If the standard filter bandwidth is narrower, the system is workable.

The method may further comprise a step of estimating a so-called detuning penalty of the filters chain by checking the detuning penalty of the system with the worst case filter (in particular, with the standard filter), and if the detuning penalty of the system with the worst case (standard) filter is not higher than the preliminarily selected threshold. In this case, the detuning penalty of the system with the chained filters will not exceed said threshold.

The term "detuning penalty" is to be understood as a value of narrowing of a filter's effective bandwidth in case the central wavelength of the carrier signal of the mentioned high bit rate signal is shifted with respect to its nominal value. This threshold is characterized by two different values. The first value is the specified standard bandwidth, the second is the detuning value specified for the maximal change in wavelength. The change in wavelength may be specified according to the end-of-life wavelength drift of the transmitter laser.

BRIEF DESCRIPTION OF THE DRAWINGS

The invention will be further described with reference to the following non-limiting drawings in which:

FIG. 6 is a diagram illustrating different behavior of filter chains in a high bit rate communication system, when different signal modulation types are used.

FIG. 7 is an exemplary test setup scheme for estimating bandwidth to limiting penalty of a high bit rate communication system, when a standard filter of 30 GHz is selected.

FIG. 8 is an exemplary recommended table for estimating the bandwidth limiting penalty of a high . bit rate communication system, for cases of using different signal modulation types.

DETAILED DESCRIPTION OF THE DRAWINGS

Figure 1:
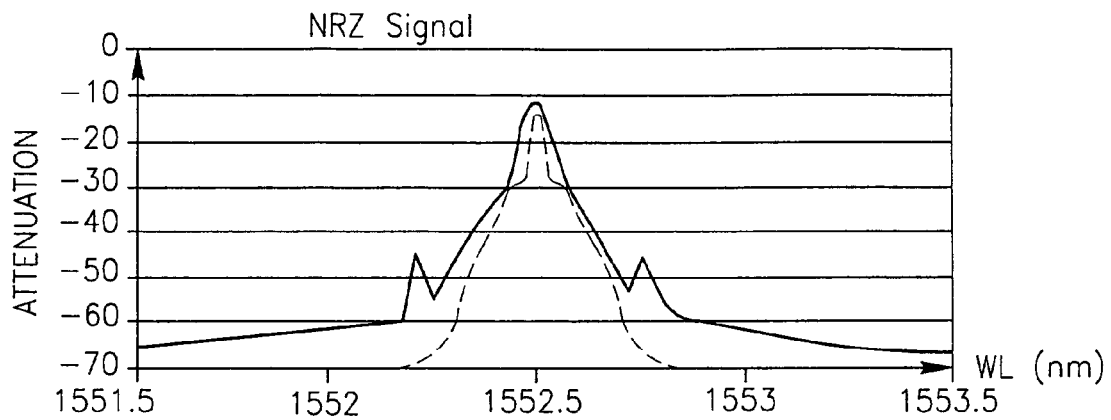
FIGS. 1, 2, 3 illustrate signals produced by different modulation schemes and the resulting spectrums after the signal is transmitted through a narrow-band filter.
Figure 2:
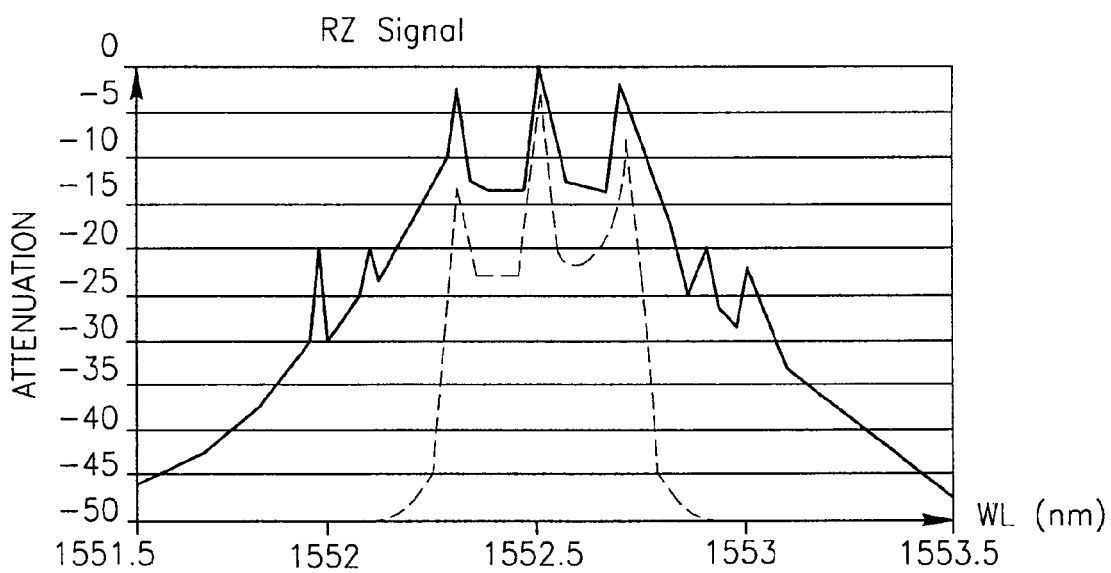
Figure 3:
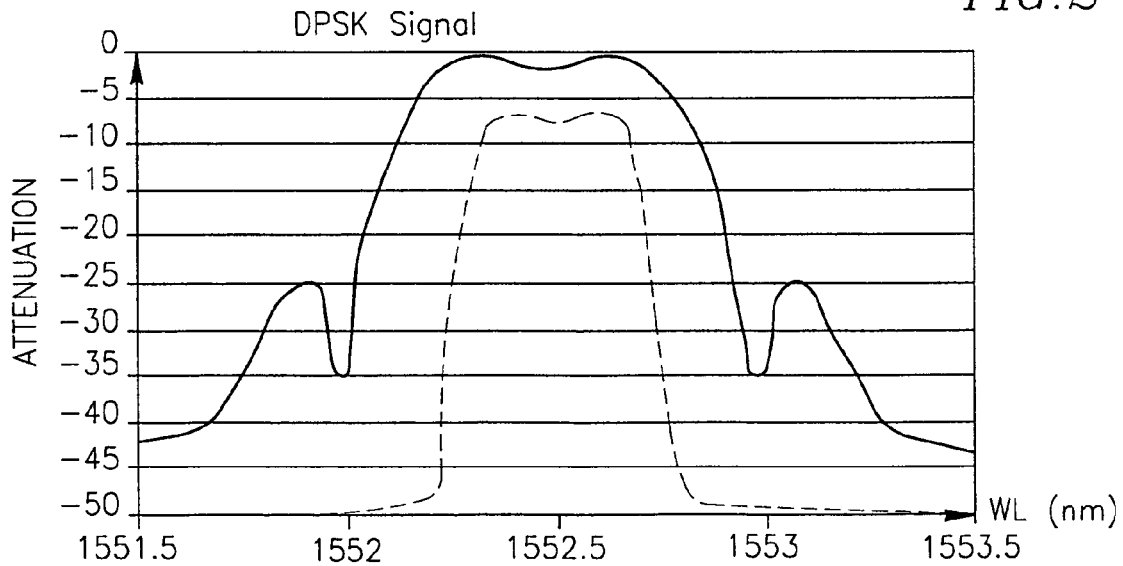

FIGS. 1, 2, 3 are results of simulations, confirmed by laboratory tests, that high bit rate—in this case 40 Gb/s—signals of different modulation formats (examples of NRZ, RZ, DPSK are shown), when transmitted in a 100 GHz spaced WDM optical communication system, successfully pass via a 50 GHz channel spaced filter.

The term "successively" means that the bandwidth limiting penalty is lower than the predetermined value, in this case—lower than 2 db.

The bandwidth (BW) of the 50 GHz channel spaced filter at the level of 1 dB is 30 GHz.

We keep in mind that the BW of a 40 Gb/s NRZ signal is equal to about 60 GHz (see conditions and rules).

Based on the proposed technique, the 50 GHz filter can be interpreted as a possible implementation of a worst case or a standard filter:

Bandwidth of the 50 GHz channel spaced filter is found in the range stated by the expression (3)

$$0.30 BW_{signal} \leq BW_{WCase filter} \leq 0.8 * BW_{signal}$$

0.3*60 GHz<30 GHz<0.8*60 GHz

Figure 4:
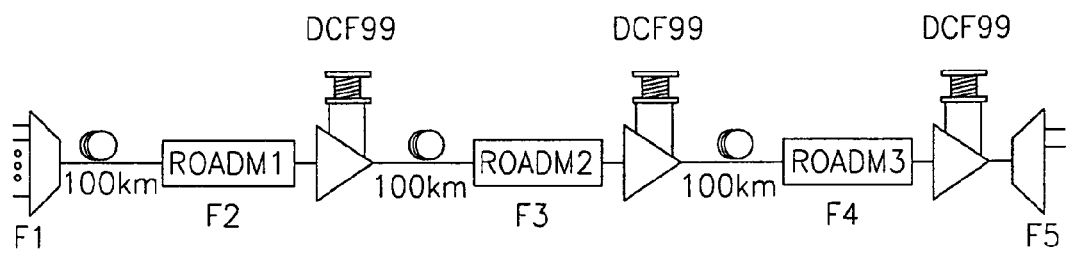
FIG. 4 an exemplary communication link comprising a number of chained filters, such as ROADMs and DWDM filters.

FIG. 4 is an exemplary link of a high bit rate system, comprising a number of chained filters: F1 (multiplexer) F2, F3, F4 (ROADM 1, 2, 3) and F5 (demultiplexer). Let us demonstrate how filter bandwidth limitation can be determined for the link in a design tool for typical fiber-optic links. For the sake of comparison, let us recall how a standardized parameter of chromatic dispersion would be estimated for the link shown in the figure.

In this system, three spans are used, each being of a 100 km length is standard single-mode fiber (SMF). Each of the spans is provided with a dispersion compensation fiber DCF 99, each compensating dispersion on 99 km of the preceding span. The overall residual dispersion can be calculated: (100 km−99 km+100 km−99 km+100 km−99 km)*16.5 ps/nm/km=49.5 ps/nm. Say that in this system, the transmitters are specified at 1 dB penalty at 50 ps/nm. One skilled in the art can easily calculate the residual dispersion (49.5 ps/nm corresponding to 3 km) and hence the overall penalty of the system.

In order to calculate the filtering bandwidth narrowing effect in this system, the transfer function of Filter F1 (MUX), filters F2, F3, F4 (ROADMs 1 to 3) and Filter F5 (DE-MUX) need to be multiplied. The resulting calculated curves, together with the curve presenting the 50 GHz channel-spaced filter (having bandwidth of about 30 GHz) as a worst case or standard filter, are shown in FIG. 5.

Figure 5:
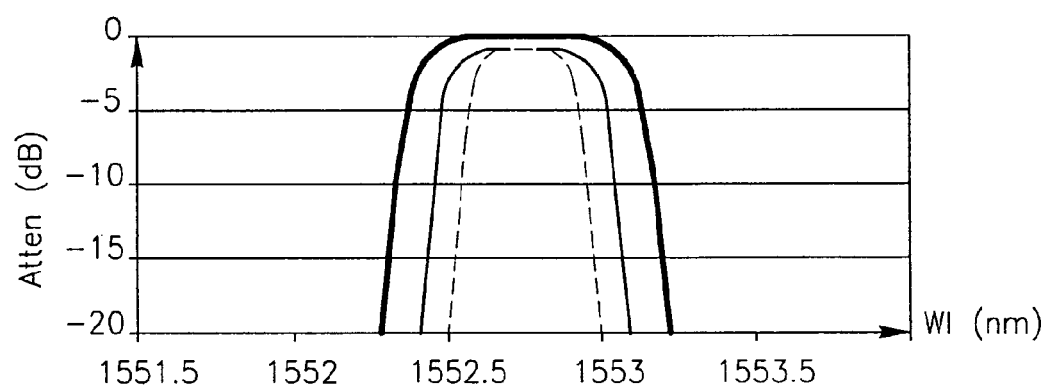
FIG. 5 a diagram demonstrating that the worst case (standard) filter selected according to the proposed method brings penalty less than the penalty created by a chain of filters (according to the calculated curve).

In FIG. 5, spectrum of one typical system filter (ROADM filter) is shown by a thick solid line: The spectrum of the chained filters (F1 to F5) is shown by a regular solid line. The standard filter's (50 GHz) spectrum is shown by a dotted line. One can see that the BW of the standard filter is narrower than that of the filter's chain and FIGS. 1-2-3 show that the system is workable with it. Returning to FIG. 5, one may perform the proposed method for the illustrated link, including the steps of selecting a worst case filter, then selecting a standard filter, checking the system with the standard filter and then confirming the result by comparing the result with the calculated filter chain.

For example here, the 1 dB typical filter bandwidth is about 72 GHz and after five chained system filters, the 1 dB system bandwidth dropped to 57.8 GHz (as has been calculated). Since the worst-case (standard) filter is used here has a 1 dB bandwidth of 35.7 GHz, the BW of five illustrated chained filters is still wider than that of the standard filter. One may conclude that, in this system, at least 5 flat-top filters can be chained with a negligible system penalty. It should further be noted that the calculation performed by the Inventor shows that ten similar chained filters bring the system bandwidth to 49.2 GHz, and that even twenty filters still give the bandwidth wider than 35.7 GHz. The above example confirms that the selected worst case flat top filter allows estimating workability of a link comprising up to 20 flat top filters.

FIG. 6 shows that influence of a chain of filters on the high bit rate communication system (i.e. decrease of the bandwidth and increase of the penalty) depends not only on the number of filters in the chain, but much more—on the type of modulation scheme used for the signal in the communication system.

Therefore, the proposed method should be applied for each modulation type separately, for example using the setup shown in FIG. 7. It should be noted that the curves illustrated in FIG. 6 characterize relative performance of different modulation schemes only generally. Moreover, even for the same modulation format, different transmission systems may perform differently.

FIG. 7 illustrates a test setup, on which the method can be implemented. Suppose we have a system similar to that shown in FIG. 4, comprising N flat top filters, and transmitting an optical signal having bit rate of 40 Gb/s. Let a worst case filter which has been selected for the system to be a flat top filter having 1 dB bandwidth of 30 GHz.

Let the worst case (standard) filter S with the bandwidth 30 GHz be connected between a transmitter Tx and a receiver Rx using a number of optical transmission links, via an optical amplifier A and a Variable Optical Attenuator (VOA) for regulating power (and consequently, OSNR) in the line.

The setup is utilized for a specific modulation type of the optical signal transmitted by the transmitter.

If the measured penalty for the standard filter in the line is below a predetermined value (1 db in this example), the testing is considered to be successful at least for the chain of flat top filters where N can be up to 20.

FIG. 8 shows an exemplary table that can be part of a data sheet, a standard specification or the like, intended to describe and illustrate performance of a communication system. The table presents a sample specification of maximal bandwidth limiting penalty values, which could be produced for a specific communication system comprising a chain of bandwidth limiting filters, tested for different modulation schemes and per one and the same selected high bit rate of the signal. For the sake of comparison with specifications of dispersion penalty, values of dispersion penalty (in ps/nm) are shown in the same table.

One may perform the proposed method by selecting a worst case (standard) filter for a high bit rate system comprising chained filters and s satisfying the mentioned conditions, and then by testing the system with the selected filter using a test setup similar to that shown in FIG. 7.

The table demonstrates that the invention presents a tool for satisfying the strong need in the field of high bit rate communications, for estimating bandwidth limiting effects in communication lines comprising chains of bandwidth limiting filters.

It should be appreciated that the drawings and the table presented above are for the purpose of example only and that the invention is generally defined by the claims that follow.

The invention claimed is:

1. A method for estimating a bandwidth limiting penalty of a chain of bandpass optical filters in an optical telecommunication system adapted to carry an optical signal having bit rate not less than 10 Gb/s, and wherein average bandwidth of the filters in the chain is of the same order of magnitude as bandwidth of the optical signal transmitted in the system, the method comprises:
   selecting a worst case filter,
   performing checking of said system, by testing and/or simulating the system being provided with the selected worst case filter instead of the chain of said bandpass filters, and
   judging about the bandwidth limiting penalty of the chain of said bandpass filters based on results of the checking and a predetermined maximal value of bandwidth limiting penalty.

2. The method according to claim 1, wherein the bit rate is not lower than 40 Gb/s and the system is a WDM system.

3. The method according to claim 1, wherein the worst case optical filter is selected to have bandwidth "$BW_{WCase\ filter}$" substantially within the range determined by the following expression:

$$0.30*BW_{signal} \leq BW_{WCase\ filter} \leq 0.8*BW_{signal}.$$

4. The method according to claim 3, wherein the step of selecting the worst case filter further comprises selecting a standard filter "S" satisfying the expression (3) so that its bandwidth is maximally close to the lower border of the expression, while still allowing passage of the optical signal there-through with the bandwidth limiting penalty not exceeding the predetermined value.

5. The method according to claim 4, wherein the step of selecting the standard filter comprises iterative sub-steps including: selecting a candidate of the standard filter, testing the system with the candidate of the standard filter, obtaining the bandwidth limiting penalty exceeding the predetermined value, selecting a filter with the bandwidth broader than that of said candidate and testing the system again until selecting such a filter that ensures operation of the system while not exceeding said predetermined value of the bandwidth limiting penalty.

6. The method according to claim 4, wherein most of said optical filters in the chain are flat top filters, and wherein the standard filter is a flat top filter.

7. The method according to claim 6, allowing estimation of the bandwidth limiting penalty of the chain comprising up to 20 flat top filters, by using the standard flat top filter having bandwidth of about 50% of average bandwidth of a filter in the chain.

8. The method according to claim 4, wherein most of said optical filters in the chain are Gaussian filters, and wherein the standard filter is a Gaussian filter.

9. The method according to claim 8, allowing estimating the bandwidth limiting effect of the chain comprising up to 4 Gaussian filters, by using the standard Gaussian filter having bandwidth of about 50% of average bandwidth of a filter in the chain.

10. The method according to claim 1, wherein the step of checking further comprises calculation of the system being provided with the chain of filters to obtain bandwidth of the chain, comparing the obtained bandwidth with the bandwidth of the standard filter, and if the bandwidth of the chain is greater than bandwidth of the standard filter, deciding that the system will operate not exceeding the predetermined value of the bandwidth limiting penalty.

11. The method according to claim 1, further comprising a step of estimating a detuning penalty of the system with the filter chain by checking the detuning penalty of the system with the worst case filter, and if the detuning penalty of the system with the worst case filter is not higher than the preliminarily selected threshold, deciding that the detuning penalty of the system with the filter chain will not exceed said threshold.

12. A software product comprising computer implementable instructions and/or data for carrying out the method according to claim 1, stored on a non-transitory computer readable storage medium so that the software is capable of enabling operations of said method, when being run on the computer.

13. A method for estimating a bandwidth limiting penalty of a chain of bandpass optical filters in an optical telecommunication system adapted to carry an optical signal having bit rate not less than 10 Gb/s, and wherein average bandwidth of the filters in the chain is of the same order of magnitude as bandwidth of the optical signal transmitted in the system, the method comprises:
    selecting a worst case filter,
    checking performance of the optical telecommunication system by transmitting an optical signal using an optical transmitter, and measuring at a receiver its power after said optical signal has passed through the selected worst case filter instead of through the chain of said bandpass filters, and
    estimating the filtering bandwidth narrowing effect of the chain of said bandpass filters based on results of the checking.

14. The method according to claim 13, wherein the worst case optical filter is selected to have bandwidth "$BW_{WCase\ filter}$" substantially within the range determined by the following expression:

$$0.30*BW_{signal} \leq BW_{WCase\ filter} \leq 0.8*BW_{signal}.$$

15. The method according to claim 14, wherein the step of selecting the worst case filter further comprises selecting a standard filter "S" also satisfying the expression:

$$0.30*BW_{signal} \leq BW_{WCase\ filter} \leq 0.8*BW_{signal}$$

wherein the standard filter enables passage of the optical signal having a bandwidth limiting penalty not exceeding a predetermined value.

16. The method according to claim 13, wherein the step of checking further comprises evaluating a bandwidth of the chain of filters, comparing the obtained bandwidth with a bandwidth of the standard filter, and if the bandwidth of the chain is greater than bandwidth of the standard filter, determining that the system will operate under conditions that will not exceed a predetermined value of the bandwidth limiting penalty.

17. The method according to claim 13, further comprising a step of estimating a detuning penalty of the system with the filter chain by checking the detuning penalty of the system with the worst case filter, and if the detuning penalty of the system with the worst case filter is not higher than the preliminarily selected threshold, determining that the detuning penalty of the system with the filter chain will not exceed said threshold.

18. An optical telecommunication system comprising:
    a transmitter operative to transmit to a receiver an optical signal having a bit rate of not less than 10 Gb/s, through optical fibers;
    a worst case filter connected between the transmitter and the receiver, wherein the worst case filter has a bandwidth "$BW_{WCase\ filter}$" substantially within the range determined by the following expression:

$$0.30*BW_{signal} \leq BW_{WCase\ filter} \leq 0.8*BW_{signal};$$

measuring means operative to measure the optical signal after its passing through the worst case filter, instead of through a chain of the bandpass filters; and
    calculating means operative to estimate the filtering bandwidth narrowing effect of the optical telecommunication system, and to enable determining whether the system will operate under a predetermined value of the bandwidth limiting penalty.

19. The system according to claim 18, wherein the calculating means further adapted to compare calculation a bandwidth of bandpass optical filters with the bandwidth of the worst case filter, and when the bandwidth of the chain is greater than bandwidth of the worst case filter, decide if the system exceeds a predetermined value of the bandwidth limiting penalty.

20. The system according to claim 18, wherein the calculating means further adapted to estimate a detuning penalty of the system with the filter chain by checking the detuning penalty of the system with the worst case filter.

* * * * *